United States Patent [19]

Ho Kim et al.

[11] 3,801,972

[45] Apr. 2, 1974

[54] GAS ANALYZER CIRCUITRY

[75] Inventors: Young Ho Kim, Palo Alto; Neil M. King, Los Altos, both of Calif.

[73] Assignee: Ambac Industries Incorporated, Garden City, N.Y.

[22] Filed: Oct. 26, 1972

[21] Appl. No.: 301,207

Related U.S. Application Data

[63] Continuation-in-part of Ser. No. 155,973, June 23, 1971, abandoned.

[52] U.S. Cl. ............ 340/237 R, 340/237 S, 340/409

[51] Int. Cl. ............................................ G08b 21/00

[58] Field of Search ..................... 340/237, 409, 214

[56] References Cited

UNITED STATES PATENTS 3,496,558 2/1970 Willson et al. .................. 340/237 R

*Primary Examiner*—John W. Caldwell

*Assistant Examiner*—Daniel Myer

*Attorney, Agent, or Firm*—Robert R. Thornton

[57] ABSTRACT

Apparatus for detecting and indicating the presence of substances such as smoke and combustible gasses. One or more detectors generate output signals which are applied to a comparator amplifier. The magnitude of the detector output signals varies unidirectionally as a function of the concentration detected. The comparator amplifier output varies unidirectionally as a function of the difference in magnitude of the detector signals. Failure detection circuitry is included which detects failure to actuate the detectors or failure of the detectors to apply their output signals to the comparator. Apparatus test circuitry is provided which is independent of the detector elements and may be preselected during testing to not actuate any safety circuits or latching relays which the apparatus may control. In a preferred embodiment, circuitry is utilized to automatically compensate for detector sensor drift or for long term concentration changes, so that only large rapid changes in concentration are detected.

20 Claims, 9 Drawing Figures

GAS ANALYZER CIRCUITRY

CROSS REFERENCES TO RELATED APPLICATIONS

This application is a continuation-in-part of U.S. Pat. application, Ser. No. 155,973, filed June 23, 1971, Young Ho Kim and Neil M. King, inventors, now abandoned.

BACKGROUND OF THE INVENTION

1. Field of the Invention

This invention relates to detectors of the type having detector elements which generate output signals having magnitudes which are functions of the concentration of material detected and which is used to generate an output indicative of the presence of the substance being detected.

2. Description of the Prior Art

Apparatus for detecting the presence of combustible gasses are well-known in the art, and are described, for example, in U.S. Pat. No. 3,586,486. The particular type of detector described in the aforesaid patent application is an improvement in the basic catalytic detector element art, exemplified by U.S. Pat. No. 2,023,731. Such detectors do not, however, detect the presence of gasses other than combustible gasses.

Detectors of the metallic oxide type, which function by utilizing a reducible metallic oxide coating between two electrodes, produce a change in resistance between the electrodes by reason of reduction of the metallic oxide of the metallic state. Such detectors are described in U.S. Pat. Nos. 3,625,756 and 3,644,795. Such metallic oxide type detectors will detect any substances which will reduce the metallic oxide to its metallic form. Various types of metallic oxides may be utilized, such as iron oxide, titanium oxide, tin oxide, or zinc oxide. Such devices are commercially available, and have been used heretofore as smoke detectors. Such a device may be utilized as a smoke detector since the presence of smoke indicates incomplete combustion has taken place. Such incomplete combustion is accompanied by the production of carbon monoxide. In actuality, it is the presence of carbon monoxide which the metallic oxide type detector detects when utilized as a smoke detector. Heretofore, no single device has combined the characteristics of the metallic oxide type detector and the catalytic type detector. A combination of these detectors is particularly useful for monitoring cargo containers and ship holds for either the presence of an accumulation of combustible gas, which would create an explosion hazard, or the presence of smoke, which would indicate the presence of a fire.

Such detectors as have existed have not provided, in their circuitry, for a failure indication upon the failure of the detector units to function. Additionally, present test circuits for such detectors have conventionally utilized a test signal generated by the detectors themselves. When the detector is utilized to generate the test signal, significant time is required after completion of the test for the detector to return to its normal operating condition. During this time, either analysis is not carried out, or incorrect analyses result. Additionally, when the detector is utilized to generate the test signal, and the apparatus is utilized to control safety equipment, such as sprinkler systems for fire suppression, sirens, and the like or controls such as latching relays, the safety equipment will be actuated unless special circuitry is utilized to de-energize the safety equipment actuator circuitry prior to initiating the test. Such circuitry de-actuation is subject to either human or mechanical failure, which, in either event, will result in the safety equipment being actuated during testing and the attendant possibility of extensive damage to materials being protected by fire suppression equipment or latching relays being latched, necessitating the shutting down of the apparatus and the unlatching of the relays before the apparatus can be operated.

Detectors of the general type with which the present application are concerned may exhibit zero drift which requires frequent calibration. Often such detectors are located in remote positions or in sealed spaces, rendering such calibration difficult or impractical. Failure to make such calibrations result in erroneous readings and alarms as to gas concentration. Furthermore, when in a sealed or closed location, often it is not the total gas concentration as much as a rapid change in concentration, indicating combustion or leakage, which is desired to be monitored. Readings giving total concentration fail to provide such an indication directly. If an automatic alarm system is utilized, the gradual buildup of concentration may actuate the alarm even though the personnel involved have takn into account the gradual buildup of concentration by making a comparison of readings over a period of time. Therefore, in such applications, automatic drift calibration and zeroing are essential in practical usage.

SUMMARY

According to the present invention, in its apparatus aspects, a pair of input signals are generated and applied to a comparator of the differential amplifier type. At least one of the input signals is the output signal from one or more detectors. The input signals, in the absence of the detection of a substance to be detected, are equal in magnitude. The detector output changes unidirectionally in magnitude as a function of the concentration of substances being detected, and the comparator has an output which changes unidirectionally in magnitude as a function of imbalance between the input signals. The comparator output is applied to output circuitry to generate an indication of the presence of the material to be detected. The apparatus also includes circuit failure detection which is actuated upon the failure of the detectors to be actuated or to apply their output signals to the comparator. A test signal generating means is provided to generate a test signal independent of the detector elements. The test signal generating means is operable to actuate local test circuit indicators without actuating any safety equipment or latching relays which may be controlled by the apparatus. By reason of the combination of circuitry to continuously indicate failure of the apparatus upon detector failure and the independent test signal generating means, the operation of the circuitry is tested in its entirety upon actuating the test circuitry. Thus, in its apparatus aspects, the present invention includes the combination of comparator means having a first signal input and a second signal input and which is operable to generate an output whose magnitude is a function of a difference in magnitude between the signals applied to the first and second signal inputs, first input signal generating means operable to detect the presence of a preselected substance and to generate a first signal for application to the first signal input of a magnitude which varies unidirectionally from a nominal value as a function of the concentration of the substance being detected, second input signal generating means operable to generate a second signal of said nominal magnitude for application to the second signal input, output means operable in response to variations in magnitude of the output from the comparator means, means for applying the comparator output to the output means, and means for applying the first and second signals to the first and second signal inputs including circuit failure detection means connected to the first input signal generating means and the second signal input generating means and operable to indicate circuit failure upon the failure of either of said input signal generating means to apply its signal to said comparator means.

Automatic zeroing and drift calibration are provided by utilization in a voltage divider network, of a sensor of the variable resistance type in series with a constant current generator circuit whose function is to change the current flow in its portion of the voltage divider network to compensate for a change in resistance in the variable resistance. Accordingly, an output signal from the voltage divider network, taken to a point between the variable resistance and the variable current generator circuit, will have a potential which tends to be stabilized, so compensating for changes in the resistance of the sensor due to either zero drift or concentration change. The current conduction of the variable current generator circuit is controlled by an input signal developed from the change in the output signal of the voltage divider network and applied to a time delay circuit. The time delay circuit has a time constant which is preselected to require a predetermined change in concentration with respect to existing concentration in order to apply an output signal to the remainder of the detector. Thereby, gradual changes in the resistance of the sensor do not actuate the remainder of the detector circuitry to indicate a change in concentration.

In its method aspects, the present invention contemplates analyzing for the presence of two components simultaneously, the components being either the same or different, comprising generating a first signal in a first detector which varies in magnitude unidirectionally in a given direction from a nominal value as a function of the concentration detected by the first detector, simultaneously generating a second signal from a second detector which varies in magnitude unidirectionally in the opposite direction from the same nominal value as a function of the concentration detected by the second detector, and applying the first and second signal to a comparator to produce an output signal whose magnitude varies unidirectionally from a nominal value as a function of the difference in magnitude between the first and second signals.

BRIEF DESCRIPTION OF THE DRAWING

The invention may be more readily understood by referring to the accompanying drawing, in which.

DESCRIPTION OF THE PREFERRED EMBODIMENTS

The present invention contemplates, although does not require, that the detector or detectors utilized will be positioned in a remote location, and an electronic circuit module which will constitute the analyzer proper will be located more conveniently for inspection and monitoring. However, the detectors according to the present invention may be located integrally with the remaining electronic circuitry if so desired. The present invention further contemplates the use of a plurality of detectors of either the metallic oxide or catalytic type, or combinations thereof, or any other detector of conventional type which generates an output signal which varies as a function of the concentration of substance detected. While the following description is related to the application of the present invention to detection of gas and/or smoke, in its broadest application the present invention may be utilized in any type detector apparatus having the requisite input signals to be applied to a comparator.

The present invention comprehends the method of analyzing for the presence of two components simultaneously be generating a first signal from a first detector and a second signal from a second detector, the first and second signals varying in magnitude unidirectionally in opposite directions from a nominal value as functions of the concentrations detected by the respective detectors, and applying the first and second signals to a comparator to produce a signal whose magnitude varies unidirectionally from a nominal value as a function of the difference in magnitude between the first and second signals. This comparator signal may then be further processed as desired to generate a visual indication of concentration, or actuate appropriate warning or alarm circuitry.

Figure 1:
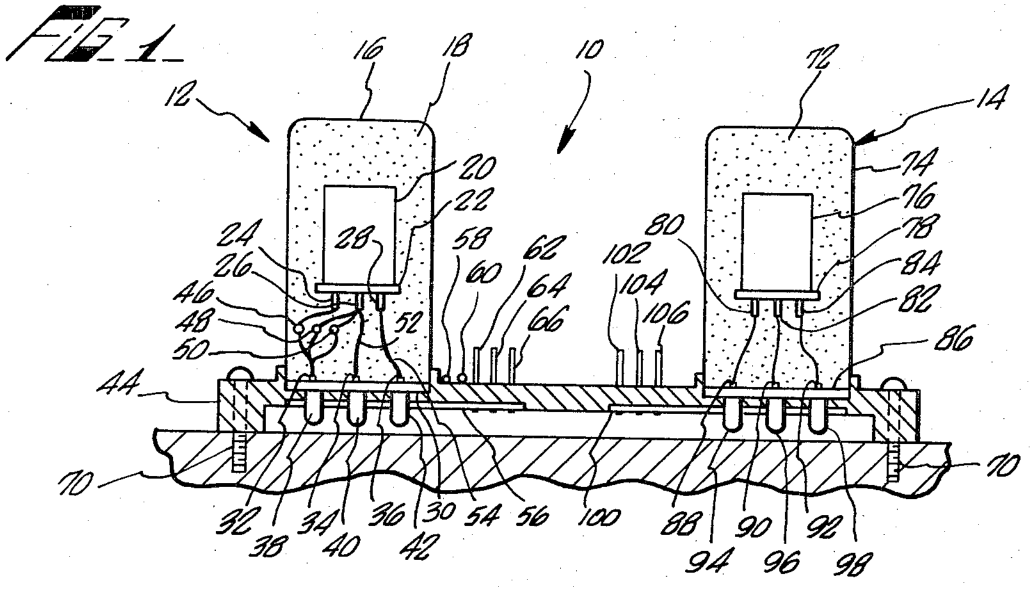
FIG. 1, is a view, in section, of a gas and smoke detector remote installation according to the present invention.

Referring now to FIG. 1 there is shown an installation of a combined gas and smoke detector 10 according to the present invention. In FIG. 1, the gas and smoke detector 10 includes a smoke detector 12 and a gas detector 14. The smoke detector 12 is of the reducible metallic oxide type heretofore referred to. The gas detector 14 is of the catalytic element type. The smoke detector 12 includes an outer screen 16 which encloses a packing of granular activated charcoal 18. Within the granulated activated charcoal packing 18, a shield 20, which is also in the form of a screen, encloses the actual elements of the smoke detector. The shield 20 is mounted on an element base 22, extending from which are first, second and third smoke detector terminals 24, 26, and 28. The screen 16 is mounted on a smoke detector base 30, thereby containing the granular charcoal packing. The base 30 has three output jacks 32, 34, 36 extending therethrough which engage, respectively, receptacles 38, 40, 42 which are mounted on a mounting base 44. A current limiting resistor 46 is connected between the terminal 24 and the jack 32. A voltage divider resistor 48 and a thermistor 50 are connected between the terminal 26 and the output jack 32. The terminal 26 is also connected directly to the output jack 34 by a conductor 52. The terminal 28 is connected to the output jack 36 by a conductor 54. A printed circuit board 56 underlies the mounting base 44 beneath the smoke detector 12 and provides appropriate electrical circuitry to interconnect the receptacles 38, 40, 42, a diode 58, a matched resistor 60, and three detector connector pins 62, 64, 66. The mounting base 44 is mounted on any appropriate surface, such as the surface 68 by means of a pair of mounting screws 70.

The gas detector 14 has a glass wool packing 72 enclosed by a screen 74. A shield 76, which may be a screen, for example, encloses the elements of the gas detector proper. The shield 76 is mounted on a base 78 from which three output terminals 80, 82, 84 extend. The screen 74 is mounted on a gas detector base 86, through which three gas detector jacks 88, 90, 92 extend. The gas detector jacks 88, 90, 92 engage, respectively, receptacles 94, 96, 98 which are mounted on and extend through the mounting base 44. A printed circuit board 100 provides appropriate electrical circuit connections between the receptacles 94, 96, 98 and three gas detector connector pins 102, 104, 106 which extend through the printed circuit board 100 and the mounting base 44.

Figure 2:
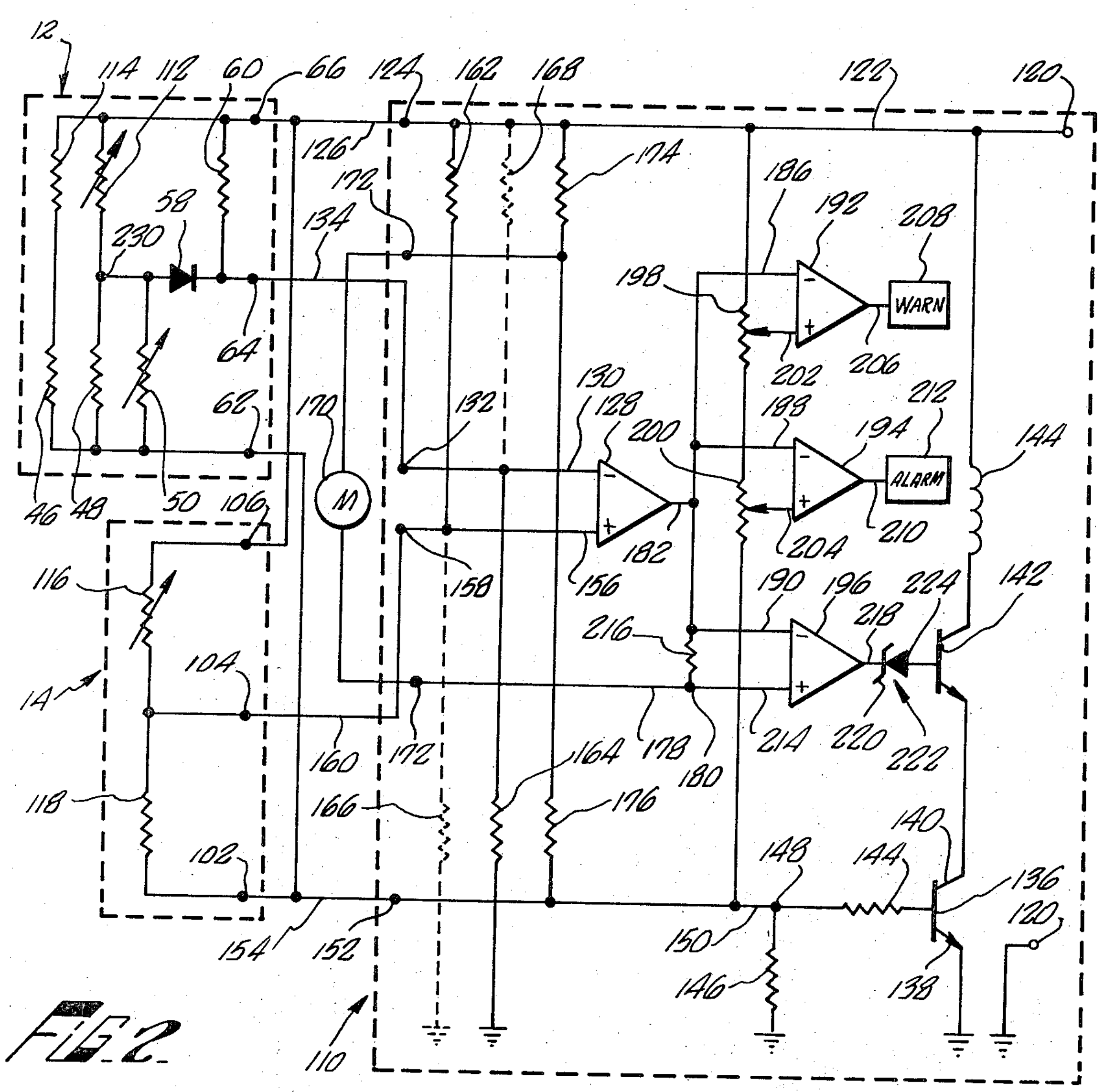
FIG. 2 is a schematic diagram of the electronic circuitry of a gas and smoke detector utilizing the remote installation of FIG. 1.

Referring now to FIG. 2, there is shown in schematic form, the electronic circuitry of the combined gas and smoke detector, whose detector elements are illustrated in FIG. 1. The smoke detector 12 is shown in FIG. 2 as a module enclosed by a dotted line, as is the gas detector 14. In addition to the smoke and gas detector modules, FIG. 2 includes an analyzer module 110, shown as enclosed by dotted lines. The smoke detector module, in addition to the components thereto as identified with respect to FIG. 1, includes a detector element 112 and a detector element heater 114. The gas detector 14 includes an active catalytic element 116 and a compensating element 118.

The analyzer module 110 has a pair of power input terminals 120, one of which is connected to the system ground. The other power input terminal 120 is connected to an actuating potential conductor 122 so as to provide an actuating voltage for the circuitry of the apparatus. An actuating potential, when applied to the actuating potential conductor 122, is applied to an analyzer module voltage output terminal 124. An interconnecting cable conductor 126 connects the voltage output terminal 124 to the detector connector pin 66 of the smoke detector and the detector connector pin 102 of the gas detector. The analyzer module 110 has a comparator amplifier 128, which is a conventional differential amplifier. The comparator amplifier 128 has a first signal input lead 130 which is connected to a first detector input terminal 132. A first detector signal interconnecting cable 134 connects the first detector input terminal 132 to the detector connector pin 64.

The analyzer module 110 circuitry has a "fail safe" circuit which includes a first transistor 136, whose emitter 138 is connected to ground. Collector 140 of the transistor 136 is connected to a circuit which includes a second transistor 142, a relay coil 144 and the actuating potential conductor 122, so that when an actuating potential is applied across the actuating potential input terminals 120 and the second transistor 142 is conducting, an actuating potential will be applied to the first transistor 136. The transistor 136 is connected to a bias developing resistor 146, so as to apply bias to the transistor, when the system is in operation, of approximately one volt, as will be explained further hereinafter. The resistor 146 is connected to a junction 148, to which junction 148 also is connected a common conductor 150. The common conductor 150, together with the first transistor 136, provide a ground return circuit for a common connector terminal 152. An interconnecting conductor 154 connects the common conductor terminal 152 to terminal 62 of the smoke detector 12 and terminal 102 of the gas detector 14.

The comparator amplifier 128 has a second signal input lead 156 which is connected to a second detector input terminal 158. A second detector signal interconnecting conductor 160 connects the input terminal 158 to the terminal 104 of the gas detector. A resistor 162 is connected between the actuating potential conductor 122 and the first detector input lead 130. The resistor 162 is at least two orders of magnitude greater in resistance than the resistance of the active element in the smoke detector 12. A similar resistor 164 is connected between the second signal input lead 156 and ground. Shown in dotted lines in FIG. 2, indicating optional inclusion for purposes to be explained hereinafter, are additional resistors 166 and 168 which, when included, form voltage divider networks respectively with the resistors 162, 164. A meter 170, graduated to indicate gas analysis, is connected between a pair of meter terminals 172. A voltage divider network consisting of a pair of resistors 174, 176 applies a potential to the meter terminal 172. The meter terminal 172, is connected by a conductor 178 to a junction 180.

The comparator amplifier 128 has an output lead 182 which is connected to input leads 186, 188, and, through resistor 184, input lead 190 of a warning amplifier 192, an alarm amplifier 194, and fail-safe amplifier 196, respectively. The amplifiers 192, 194, 196 are differential amplifiers similar to the comparator amplifier 128. A voltage divider circuit consisting of a first potentiometer 198 and a second potentiometer 200 is connected between the actuating potential conductor 122 and the common conductor 150. The first potentiometer 198 has a potentiometer arm 202 which is connected as a second input for the warning amplifier 192. The potentiometer 200 has a potentiometer arm 204 which is connected as a second input for the alarm amplifier 194. The warning amplifier 192 has an output lead 206 which is connected to a warning circuit 208, which may be any conventional type of circuitry appropriate for providing the desired warning. The alarm amplifier 194 has an output lead 210 which is connected to an alarm circuit 212, which is any appropriate alarm circuitry. The fail-safe amplifier 196 has a second input lead 214 which is connected to the junction 180. A resistor 216 is connected between the first and second input leads 190, 214 for the fail-safe amplifier 196. The output of the fail-safe amplifier 196 is applied by an output lead 218 to a cathode 220 of a zener diode 222. The zener diode 222 has an anode 224 which is connected to the second transistor 142 at its base. A resistor 226 is connected between the fail-safe amplifier input lead 190 and the common conductor 150 to provide a voltage divider network with resistor 184 for the signal input to the fail-safe amplifier 196 from the comparator amplifier output lead 184.

The operation of the circuit in FIG. 2 will now be described. For purposes of explanation, assume that an actuating potential of six volts is applied to the terminals 120. A voltage divider network, consisting of the resistors 60, 164, is connected across the six volt potential, to provide a potential of three volts at the terminal 64, and consequently, at the cathode of the diode 58 in the smoke detector module 12. The detector element 112 and voltage divider resistor 48 are connected together at a junction 230. Current normally flows in a circuit consisting of the detector element 112, the voltage divider resistor 48 through terminal 62, the interconnecting conductor 154 and common conductor 150 and the bias developing resistor 146. The valve of the voltage divider resistor 48 is selected so that the potential at the junction 230, under conditions of detection of no smoke, is about two volts. Consequently, the potential applied to the first input of the comparator amplifier 128 through the first detector signal interconnecting cable 134 and first detector input terminal 132 is three volts. Upon the detection of smoke, the resistance of the first detector element 112 decreases, so that the potential at the junction 230 increases. When the potential at the junction 230 exceeds three volts, diode 58 commences conducting, and any potential greater than three volts which exists at the junction 230 will be applied by the diode 58 to the connector pin 64 and consequently through the first detector signal interconnecting cable 134 and first detector input terminal 132 of the first input of the comparator amplifier 128. Assuming that the potential applied to the second input of the comparator amplifier 128 through the second signal input lead 156 is three volts, the comparator amplifier 128 normally has an output of three volts. Upon the application to the first detector input terminal 132 of a potential greater than three volts, the comparator amplifier 128 output potential decreases, causing an output signal to be generated in the output lead 182. The function of the output signal will be described further hereinafter. The function of the thermistor 50 is to compensate for change in the resistance of the detector element 112 as a result of change in ambinet temperature, so as to maintain the nominal two volt potential at the junction 226 in the absence of detection of smoke. The heater element 114 serves to actuate the detector element 112, and the current limiting resistor 46 serves to limit the current flow through the heater element 114 to the desired amount.

In the gas detector 14, the active catalytic element 116 and compensating element 118 form a voltage divider network with the bias developing resistor 146, which effectively extends across the input terminals 120. The relative resistances of the catalytic element 116 and compensating element 118 are selected so that, with the potential normally existing in the common conductor 150 by reason of the current flow through the bias developing resistor 146, the potential at the detector pin 104, corresponding to the potential existing at the connection between the catalytic element 116 and compensating element 118, is three volts. This potential is then applied through the second detector signal interconnecting conductor 160 and the input terminal 158 to the second signal input lead 156. Upon detection of a combustible gas, the resistance of the catalytic element 116 increases, causing the potential at the second detector pin 104 to decrease. The decrease in the potential at the detector pin 104 from three volts is applied to the comparator amplifier 128, causing the normal three volt output of the comparator amplifier 128 to decrease and generating an output signal in the output lead 182.

The comparator amplifiers shown in FIG. 2 are of conventional construction. Plus and minus rotations are used in inputs of the amplifiers to indicate that, if the potential at the plus terminal is higher than the input at the minus input terminal, the output of the amplifier increases, and if the potential at the minus input is higher than the potential at the plus input, the output potential decreases.

Figures 3, 5:
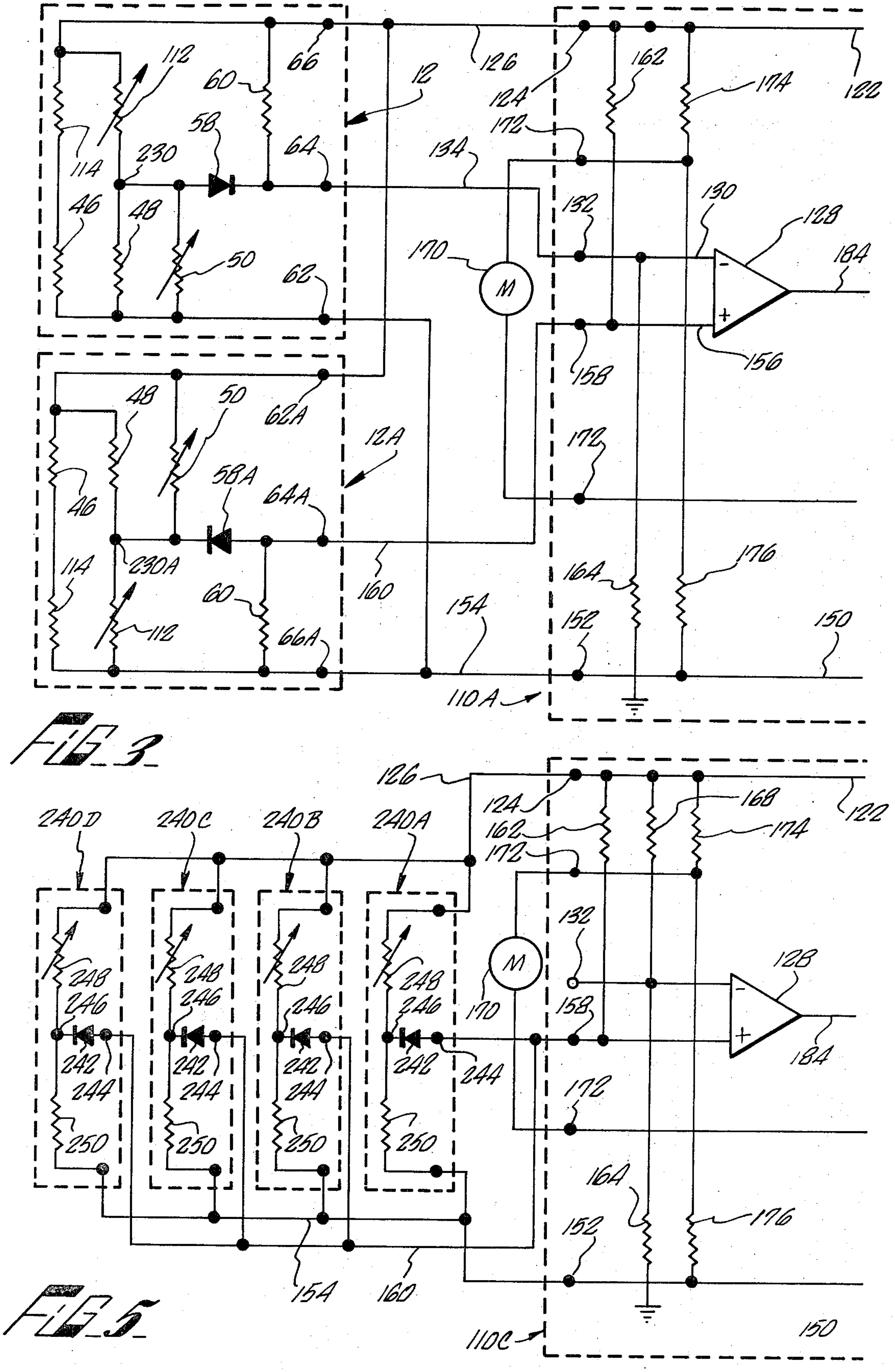
FIG. 3 is a partial schematic diagram of an alternate embodiment of electrical circuitry according to the present invention.
FIG. 5 is a partial schematic diagram of another alternate embodiment of connecting circuitry according to the present invention.

From the foregoing, it will be seen that an output signal is generated in the output lead 128 upon the detection of either gas or smoke. Often, both gas and smoke will be detected simultaneously. In order to avoid a possible failure to indicate simultaneous detection of gas and smoke, which might result if the potentials applied by the detectors to the comparator amplifier 128 increased or decreased simultaneously in response to detection, the detector outputs are predetermined so that one detector output potential applied to the comparator amplifier 128 increases upon detection, and the other detector output potential applied to the amplifier decreases upon detection. Obviously, by appropriate circuitry changes, the gas detector 14 could have its output applied to the minus input terminal of the comparator amplifier 128 and the smoke detector 12 could have its output applied to the plus input terminal of the comparator amplifier 128. In the gas detector 14, the relative positions of the active element 116 and catalytic element 118 would be reversed. An example of the circuitry revision for the smoke detector 12 is shown in FIG. 3, and will be referred to hereinafter.

In the example of operation being described, the nominal or no gas or smoke detection output potential of the comparator amplifier 128 is three volts. This output potential is applied to the minus input terminals of the warning amplifier 192 and the alarm amplifier 194. The three volt potential is also applied through the voltage divider network consisting of resistors 184 and 226, to the minus input terminal of the fail-safe amplifier 196. By reason of this potential passing through the aforesaid voltage divider network, the actual potential applied to the minus input terminal to the fail-safe amplifier 196 is slightly below three volts. The input potential applied to the plus input terminal in the fail-safe amplifier 196 is normally three volts, and is generated by the voltage divider network consisting of resistors 174 and 176 and the bias developing resistor 146. The potential existing between the resistors 174, 176 is coupled through the meter 170 and meter terminals 172 to the junction 180, from which it is conducted by the second input lead 214 to the plus input of the fail-safe amplifier 196. Normally, therefore, the output of the fail-safe amplifier 196 is a potential more positive than three volts.

It should be pointed out that, typically, differential amplifiers now commercially available of the type shown in FIG. 2 have the characteristic that, when an imbalance exists between potentials applied to the input terminals, the amplifiers conduct at saturation. Therefore, upon an imbalance existing, the maximum or minimum potential to be reached in the output lead will be reached regardless of the amount of imbalance applied to the input terminals. In order to reduce the gain of such a differential amplifier, in order that the comparator amplifier may provide an output potential which is a function of the magnitude of input potential imbalance, the gain of the comparator amplifier is limited, typically by use of a feedback resistor, whereas the gain of the remaining differential amplifiers is essentially infinite. As the use of such feedback circuitry is well known in the art, it has not been specifically included as a separate element in the circuitry shown in FIG. 2, and is to be understood as to be included in the comparator amplifier 128 circuitry.

As the fail-safe amplifier 196 normally has a higher potential applied to the plus input than is applied to the minus input, the potential in the output lead 218 is normally at its maximum positive potential. This positive potential may be, typically, four volts, and is applied to the cathode 220 of the zener diode 222. The zener diode 222 may, for example, be such as to produce a 2.4 volt drop across the diode, so that the potential, existing at the zener anode 224 and consequently applied to the base of the second transistor 142, would be 1.6 volts. If the potential applied to the minus input of the fail-safe amplifier 196 exceeds the potential applied to the plus input, the output potential existing in the output lead 218 will decrease to approximately two volts, and by reason of the 2.4 volt zener diode connected between the output lead 218 and the second transistor 142, the potential applied to the base of the second transistor 142 will fall to zero, causing the transistor 142 to cease conducting. When the second transistor 142 ceases conducting, the electrical circuit continuity for the relay coil 144 is broken, so as to actuate the appropriate related circuitry to indicate a failure in the apparatus.

The plus terminal inputs for the warning amplifier 192 and alarm amplifier 194 are constant potentials which are developed across a voltage divider network consisting of first potentiometer 198, second potentiometer 200 and the bias developing resistor 146. The potential to be applied to the warning amplifier 192 is selected by adjustment of the potentiometer arm 202 so that the potentiometer arm 202 applies the appropriate potential to the plus input. Similarly, the potentiometer arm 204 of the second potentiometer 200 applies a second selected potential to the plus input of the alarm amplifier 194. The potential applied to the plus input of the alarm amplifier 194 is less than the potential applied to the plus input of the warning amplifier 192. Both are less than the three volt normal output potential of the comparator amplifier 128.

Upon an imbalance existing between the input potentials to the comparator amplifier 128, an output potential is generated in the output lead 182 which is a function of the imbalance. The imbalance is, itself, a function of the concentration of gas or smoke or both being detected. The potential in the output lead 182 decreases, first reaching and then falling below the potential applied by the first potentiometer arm 202 to the plus input of the warning amplifier 192. Normally, therefore, the output potential in the warning amplifier output lead 206 is at its minimum value, since the potential applied to the minus input of the warning amplifier 192 is greater than the potential applied to the plus input. A coupling zener diode, such as the zener diode 222 referred to with respect to the fail-safe amplifier, may be used to provide a zero potential when the warning amplifier output potential is at its minimum. When the potential applied to the minus input of the warning amplifier 192 falls below the potential applied to the plus input, the output potential in the warning amplifier output lead 206 becomes more positive, exceeding the voltage drop across the zener diode necessary to cause diode conduction, and so actuating the warning circuit 208. Similarly, when the output potential in the comparator amplifier output lead 182 falls below the potential applied to the plus input of the alarm amplifier 194 through the second potentiometer arm 204, the potential existing in the alarm amplifier output lead 120 rises, actuating the alarm circuit 212.

As mentioned heretofore, normally an imbalance exists in the potentials applied to the plus and minus inputs of the fail-safe amplifier 196, the minus input being less than the plus input, the fail-safe circuitry being actuated upon the minus input exceeding the plus input. Failure of various of the component parts of the apparatus is detected by the fail-safe circuitry. For example, if the first detector signal interconnecting cable conductor 134, is opened, the potential existing at the first detector input terminal 132, which is applied to the comparator amplifier 128 as the minus input will go to zero, the minus input terminal being effectively grounded through resistor 164. The output potential existing in the comparator amplifier output lead 182 will then increase to a value greater than three volts, causing current to flow through the resistor 216 and develop a potential imbalance between the input terminals of the fail-safe amplifier 196 such that the minus terminal is more positive than the plus terminal. The output potential in the fail-safe amplifier output lead 218 then decreases, deactuating the relay 144 to indicate a circuit failure.

If either of the interconnecting conductors 126, 154 associated with respect to either the smoke detector 12 or the gas detector 14, current flow through the bias developing resistor 146 decreases, by reason of the lack of current flow through the detector elements. The decrease in current flow through the bias developing resistor 146 lowers the potential existing in the common conductor 150, which potential is applied to the base of the first transistor 136. The reduced potential causes the first transistor 136 to decrease the current conducted to a level which deactuates the relay 144, thereby actuating the failure circuitry.

Opening of the second detector signal interconnecting conductor 160 causes the actuating potential to be applied to the plus input terminal of the comparator amplifier 128 through the resistor 162. The output potential in the output lead 182 then increases, causing the second transistor 142 to cease conducting and the relay 144 to be deactuated, thereby actuating the failure circuitry.

In operation, either the smoke detector 12 or the gas detector 14 may detect the presence of an appropriate substance. If the smoke detector 12 detects carbon monoxide of a concentration sufficient to cause the potential at the junction 230 to exceed three volts, a signal imbalance exists in the comparator amplifier 128, producing a drop in the output magnitude of the comparator amplifier. Nominally, the output of the comparator is three volts, which is applied through the output lead 182 to the resistor 216. The voltage divider network 174, 176, 146 applies a similar three volt potential through the meter 170 to resistor 216. When the output potential in the output lead 182 falls, a potential differential is created across the resistor 216, causing current to flow through the meter 170. The magnitude of current flow through the meter 170 will indicate the magnitude of the smoke concentration detected.

In a similar manner, detection by the gas detector 14 of a gas to be detected results in an imbalance at the input to the comparator amplifier 128. This imbalance results in a decrease in the magnitude of the comparator amplifier output from three volts, again producing a meter indication on the meter 170 detector 14 and the smoke detector 12 simultaneously detect gas and carbon monoxide, the minus input of the comparator amplifier 128 will receive a signal input which increases, while the plus input of the comparator amplifier 128 will receive a signal input which decreases. Consequently, the potential applied to the minus input will be higher than the potential applied to the plus magnitude, again producing a reading in the meter 170.

As will be apparent, the quantity of carbon monoxide detected prior to application of an initial variation in input signal to the minus input of the comparator amplifier 128 will be determined by the potential existing at the junction 230 in the smoke detection condition. Thus, by selecting the value for the voltage divider resistor 48, the initial "sensitivity" of the overall analyzer to smoke is predetermined.

As was pointed out with respect to FIG. 1, the smoke detector 12 includes a packing of activated charcoal. The activated charcoal serves to insulate the detector element proper from the surrounding atmosphere to prevent actuation of this particular type of detector element by hydrocarbon vapors, which might otherwise produce a false indication of smoke, inasmuch as this type of detector is sensitive to hydrocarbon vapors as well as carbon monoxide. The charcoal packing in the smoke detector 12 further serves to avoid actuation of the circuitry by the existence of transient conditions such as persons smoking in the proximity of the detector or a momentary change in carbon monoxide or volatile gas concentration. The gas detector 14 includes a glass wool packing, which serves to insulate the detector element proper from the surrounding atmosphere, in order to avoid a possible explosion in the event that the concentration of hydrocarbon vapors being detected reaches or exceeds the lower explosive limit.

Referring now to FIG. 3 there is shown a portion of the circuitry of FIG. 2 relating to the comparator, together with the replacement of the gas detector 14 by a second smoke detector 12A. The smoke detector 12A corresponds generally to the smoke detector 12 in configuration, except that the relative disposition of the components, with respect to the actuating potential, is reversed. In addition, the polarity of the diode 58 in smoke detector 12 is reversed in smoke detector 12A. The actuating potential from the actuating potential conductor 122 is applied to detector pins 66, 62A of the detectors 12, 12A, respectively. The interconnecting conductor 154 is connected to the detector pins 66, 66A. The output of the detector 12A is nominally three volts. This three volt nominal potential is developed through the voltage divider network consisting of resistor 162, which is connected to the actuating potential conductor 122 in the analyzer module 110A, and which was shown in dotted lines in FIG. 2, resistor 60 in gas detector 12A, and the bias developing resistor 146 (not shown, see FIG. 2). The detector element 112 and voltage divider resistor 48 of the detector 12A are connected together at a junction 230A. The potential at the junction 230A is nominally four volts, for the six volt actuating potential, so that the diode 58A is normally nonconducting. Upon the decrease in resistance of the detector element 112 in response to the presence of smoke, the potential at the junction 230A falls, and when the potential falls below three volts, diode 58A commences conducting, so that the potential applied to the plus input of the comparator amplifier 128 decreases. Since the input potential applied to the minus input of the comparator amplifier 128 is never less than three volts, an output signal is generated in the output lead 184 as a reduction in the nominal three volt potential existing therein. The magnitude of the drop in the output of the lead 184 is a function of the smoke concentration, once an initial imbalance exists between the inputs to the comparator amplifier 128.

Figure 4:
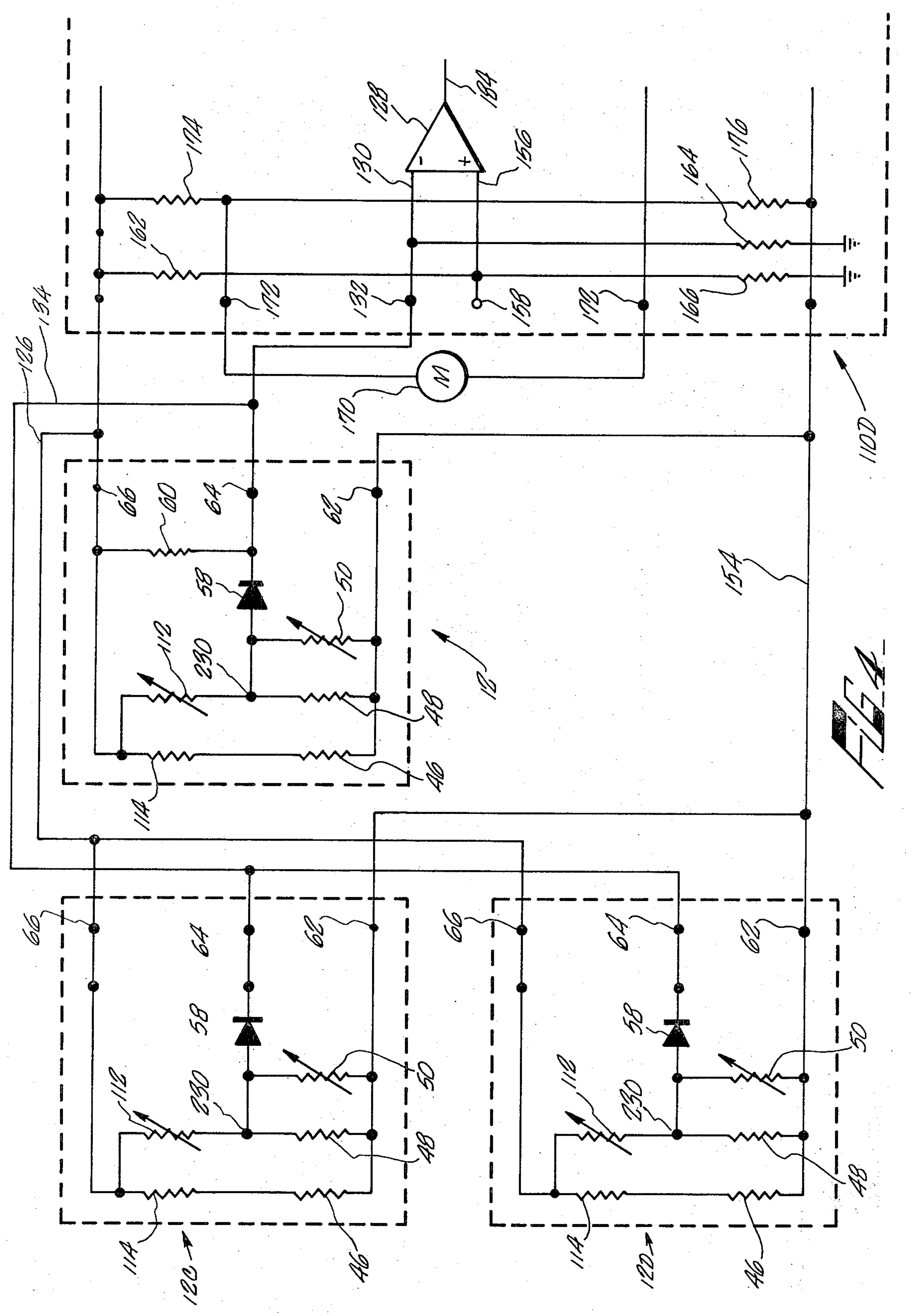
FIG. 4 is a partial schematic diagram of another alternate embodiment of electronic circuitry according to the present invention.

FIG. 4 is a schematic diagram of another embodiment of analyzer according to the present invention in which multiple smoke detectors are utilized. In this embodiment, three smoke detectors 12, 12C and 12D are connected in parallel. Each of the detectors 12, 12C, 12D has a nominal three volt output signal applied to the minus input terminal of the comparator amplifier 128. When one of the smoke detectors 12, 12C, 12D detects a smoke concentration such that its detector element 112 changes in resistance sufficient to cause its junction 230 to exceed three volts in potential, the associated diode 58 will commence to conduct, and the potential in excess of three volts will be applied to the minus input of the comparator amplifier 120 through the first detector signal interconnecting cable 134. Because of the polarity of the diodes 58 in the remaining detectors, this increase in potential above three volts will not be coupled back through the other detectors. In FIG. 4, all thre detectors have their signal outputs applied to the minus input of the comparator amplifier. In such an embodiment, it is necessary to produce a nominal input for the plus input of the comparator amplifier 128, which nominal input will correspond to the no smoke magnitude of the minus input. A three volt potential is applied to the plus input of the comparator amplifier 128 by means of a voltage divider network consisting of resistor 166, connected between the second signal input lead 156 and ground, and shown in dotted lines in FIG. 2, and resistor 162. Thus, the voltage divider network 162, 166 corresponds, insofar as providing a reference signal to determine signal imbalance resulting from smoke detection, to the signal produced by the gas detector 14 in FIG. 2 and the smoke detector 12A in FIG. 3.

Referring now to FIG. 5, there is shown another embodiment of the present invention utilizing a plurality of detectors connected in parallel. In FIG. 5, four detectors 240A, 240B, 240C, 240D, are connected in parallel between the actuating conductor 122 and the common conductor 150. The detectors 240A, 240B, 240C, 240D have diodes 242 connected between the detector connector pins 244 and a junction 246 between a detector element 24B and a compensating element 250. The diodes 232 serve to isolate each of the associated detectors from the remaining detectors insofar as producing a signal input for the comparator amplifier 126 is concerned. Thus, normally, the input to the comparator amplifier 128 plus input is a three volt potential. Initial bias is applied to the plus input of the comparator amplifier 128 through the resistor 162. However, this bias is the full actuating potential, and is reduced to three volts by conduction of the diodes 242 to couple the three volt potential which exists at the junction 246 of the active and compensating elements to the detector pin 244. When one of the gas detectors 240A, 240B, 240C, 240D detects a gas, the potential at the junction 246 decreases, due to the increase in resistance of the active element 248. This decrease in potential is coupled, due to the polarity of the diode 242 associated with the detector, through the detector pin 244 to the plus input of the comparator amplifier 128. The decrease in potential is not coupled to the junctions 246 the remaining detectors, however, due to the polarity of the diodes 242 associated therewith. Consequently, each of the detectors 240A, 240B, 240C, 240D is isolated from the remaining detectors insofar as its signal output is concerned, and the potential applied to the plus input of the comparator amplifier 128 will correspond to the greatest deviation of potential at the junction 246 of any of the detectors 240A, 240B, 240C, 240D from three volts. An input of three volts is applied to the minus input of the comparator amplifier 128 through a voltage divider network consisting of resistor 168, connected to the actuating potential conductor 122 and shown in dotted lines in FIG. 2, and resistor 164. Consequently, when any of the gas detectors 240A, 240B, 240C, 240D detect a gas, causing a change in the resistance of the associated active element 248, a potential imbalance exists between the minus and plus inputs of the comparator amplifier 128, causing a decrease in the potential which exists in the output lead 184, the magnitude of the decrease being a function of the concentration of gas detected. In FIG. 5, all of the gas detectors 240A, 240B, 240C, 240D are connected so that their signal output is applied to the plus input of the comparator amplifier 128. As was mentioned heretofore, detectors can also be utilized with their signal outputs applied to the minus input of the comparator amplifier 128, by simply reversing the manner in which the actuating potential is applied to the detectors and reversing the polarity of the diodes 232. Conversely, if the active element 248 is of the type which decreases in resistance in response to detection, the configuration of FIG. 4 would be utilized or the element 248 and compensating element 250 would be interchanged in position.

With respect to each of the embodiments shown in FIGS. 2 through 5, it will be noted that the various modules are interconnected by three connectors, i.e., the interconnecting conductor 126, the first detector signal interconnecting conductor 134, the common conductor 150, and the second detector signal interconnecting conductor 160. The purpose of these interconnecting conductors is to permit the various detectors to be located remote from the analyzer module proper. If the detectors, in a typical example, are located in the immediate proximity of the analyzer module, for example 15 to 20 feet, typically a six volt potential in the actuating potential conductor 122 will be satisfactory. However, if the detectors are to be located an extreme distance from the analyzer module proper, normally it will be desirable to increase the potential applied to the detectors to, for example, 8.5 volts for a location of a thousand feet from the analyzer module. The increase in potential is provided to compensate for voltage drop in interconnecting cables due to cable resistance. However, it should be understood that one of the primary advantages of the present invention is that multiple detectors of various types can be located extreme distances from the analyzer module proper, each separately detecting with respect to a specific location, and providing a common indication as to all detector outputs.

Figure 6:
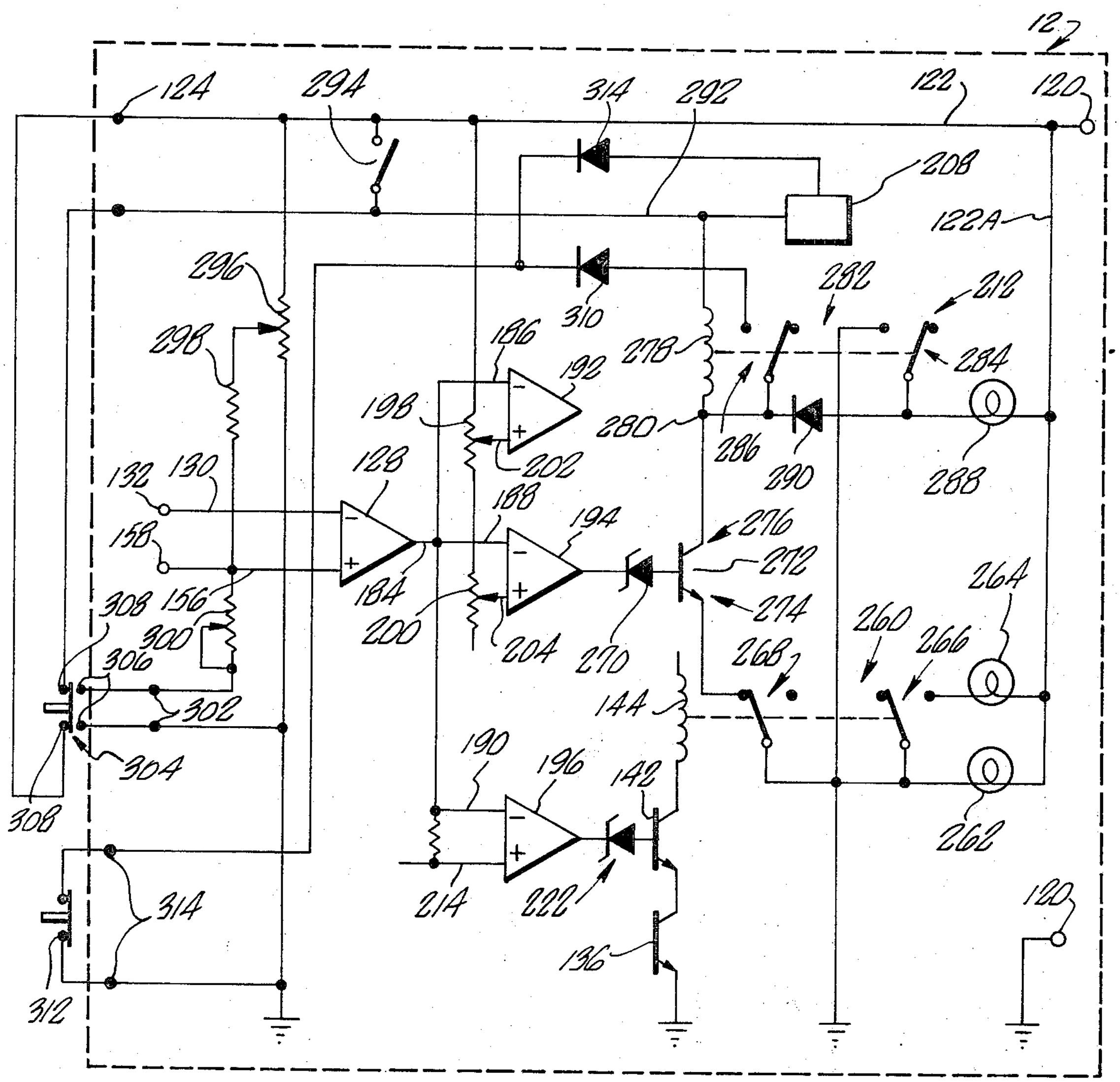
FIG. 6 is a schematic diagram of the test circuit according to the present invention.

Referring now to FIG. 6, there is shown, in schematic diagram form, the preferred embodiment of circuitry according to the present invention to provide for the selective nonactuation of the warning and alarm circuit 208, 212 except to provide for a visible indication of circuit function. In FIG. 6, the electronic circuitry is indicated as additional circuitry on the circuit board 110', which includes, in part, the basic circuitry illustrated in FIG. 2. Such common circuitry is illustrated in FIG. 6 insofar as it is necessary in order to understand the operation of the circuitry illustrated in FIG. 6. The alarm circuit 212 is illustrated in detail, and it will be understood that the warning circuit 208 may be identical to the detailed circuitry illustrated with respect to the alarm circuit 212. The relay coil 144 is shown as the actuating coil for a failure relay 260, shown in FIG. 6 in its energized position. When electrical power is applied to the printed circuit board 110' at the input terminals 120, the relay coil 144 is energized, assuming that the fail-safe circuit heretofore described as including transistors 136, 142 permits these transistors to conduct so as to complete electrical circuit continuity through the relay coil 144.

Upon the application of electrical potential to the printed circuit board 110', a pilot lamp 262 is lighted. The failure relay 260 is illustrated as a double pole double throw relay, having a first pole and set of contacts 266 and a second pole and set of contacts 268. In FIG. 6, both poles are shown in their energized position. As will be apparent from FIG. 6, when electrical power is applied to the printed circuit board 110', if the relay coil 144 does not energize the failure relay 260, electrical circuit continuity through a failure lamp 264 will exist by means of the first pole and set of contacts 266, causing the lamp 264 to be illuminated. Simultaneous illumination of the pilot lamp 262 and failure lamp 264 indicate that electrical power is being applied to the printed circuit board but that the failure relay has not been energized by the relay coil 144.

As has been described heretofore, when the differential in input applied to the alarm amplifier 194 exceeds a predetermined magnitude, the alarm circuit is actuated. The alarm circuit actuation is accomplished by application of the output of the alarm amplifier 194 to a zener diode 270, which is connected between the alarm amplifier 194 and an alarm transistor 272 as the transistor base input. Therefore, until the output of the alarm amplifier 194 is sufficient to cause the zener diode 270 to conduct, the transistor 272 is maintained in a nonconducting condition. The transistor 272 has an emitter circuit 274 which connects the transistor 272 to the second pole and set of contacts 268 of the failure relay 260. Upon energization of the failure relay 260, circuit continuity exists for the emitter circuit 274 through the second pole and set of contacts 268 to ground.

The transistor 272 also has a collector circuit 276 which is connected to an alarm relay coil 278 at a junction 280. The alarm relay coil 278 actuates an alarm relay 282 of the same general type as the failure relay 260. The alarm relay 282 has a first pole and set of contacts 284 and a second pole and set of contacts 286. An alarm lamp 288 is connected between an actuating potential conductor 122A and the junction 280 in series with an isolating diode 290. The actuating potential conductor 122A also supplies the electrical potential to the pilot lamp 262 and failure lamp 264. As will be apparent, when the alarm transistor 272 is nonconducting, electrical circuit continuity for the failure alarm lamp 288 does not exist. However, when the alarm transistor 272 commences conducting, electrical circuit continuity for the failure lamp will exist, as the potential at the junction 280 approximates ground potential.

The alarm relay coil 278 has an actuating potential applied thereto by means of an alarm relay input lead 292. The electrical potential in the lead 122 is applied to the alarm relay input lead 292 by one of two means. If, upon testing the alarm circuit, the alarm relay 282 is to be actuated, the potential existing in the lead 122 is continuously applied to the alarm relay input lead 292. However, as will be described hereinafter, it is preferable to provide circuitry by which either the potential in the lead 122 is not applied to the alarm relay input lead 292 during testing of the alarm circuit, or such application may be selectively made at the option of the person performing the test. In order to provide for the selective application of the potential in the lead 122 to the alarm relay input lead 292, a switch 294 is connected between the leads 122, 292. When this switch 294 is closed, the potential existing in the lead 122 is also applied to the alarm relay input lead 292.

In order to test the operation of the detector circuitry, other than the operation of the detector elements themselves, test circuitry is provided to apply a test input signal to the comparator amplifier 128. This test input signal is generated by a voltage divider network connected between the lead 122 and ground, consisting of a biasing potentiometer 296, whose arm is connected to an isolating resistor 298. The arm of the biasing potentiometer 296 is adjusted to provide a normal input bias to the lead 156 which is equal to the potential of the lead 156 during normal circuit operation. The isolating resistor is of such a magnitude as to prevent significant biasing effect on the lead 156 during normal operation. A test range potentiometer 300, connected so as to provide an adjustable resistance, is connected between the lead 156 and one of a pair of test output terminals 302 on the printed circuit board 110'. The other of the test output terminals 302 is connected to ground. A double pole double throw push button switch 304 has a first set of contacts 306, normally open, which are connected to the test output terminals 302. The switch 304 has a second set of contacts 308, normally closed, which are connected between the lead 122 and the alarm relay input lead 292 so that the push button switch 304, in its normally closed position, is in parallel with the switch 294.

When the push button switch 304 is actuated, so as to close circuit continuity between the first set of contacts 306, a test input signal is applied to the lead 156 by reason of the voltage divider network consisting of the isolating resistor 298 and the test range potentiometer 300, causing an imbalance in the input signals to the comparator amplifier 128. The imbalance is of a preselected magnitude comparable to the imbalance required to actuate either the warming circuit alone or both the warning circuit and the alarm circuit, as desired. The magnitude of the imbalance is preselected by adjustment of the test range potentiometer. Upon application of this test signal to the comparator amplifier, the alarm amplifier 194 conducts sufficiently to cause conduction through the zener diode 270, thereby causing the alarm transistor 272 to commence conduction, reducing the potential at the junction 280 from the actuating potential to approximately ground potential. However, if the switch 294 is closed, the actuating potential will be applied across the alarm relay coil 278, thereby energizing the relay coil and causing the alarm relay to be actuated. Actuation of the alarm relay 282 completes electrical ircuit continuity through the first pole and set of contacts 284 from the alarm lamp 288 to ground and, through the second pole and set of contacts 286, from the alarm lamp through the isolating diode 290 to ground through a reset circuit consisting of a reset isolating diode 310, a reset switch 312 of the double pole single throw type, and a pair of reset switch terminals 314 on the printed circuit board.

The test switch 304 is preferably of the momentary make type, so that upon its release, the switch returns to the position shown in FIG. 6, thereby removing the test input signal from the comparator amplifier 128. The alarm transistor ceases conducting when the test input signal is no longer applied to the comparator amplifier, inasmuch as the alarm amplifier 194 will no longer have an unbalanced input, and so return to its normal operating condition, thereby terminating conduction of the zener diode 280 and thus the alarm transistor 272. However, if the alarm relay 282 has been actuated, electrical circuit continuity for the alarm relay coil 278 between the actuating potential and ground will continue to exist even though the alarm transistor ceases conducting. The circuit continuity for the continued energization of the alarm relay coil 278 exists by two parallel circuits, one through each of the pole and contact sets of the alarm relay 282. In order to deenergize the relay coil 278, the reset switch 312 is depressed, thereby opening the electrical circuit continuity through the second pole and set of contacts 286. The isolating diode 290 is of a polarity such that the potential at the first pole and set of contacts is ground potential. Due to the voltage drop across the isolating diode 290, the polarity of the isolating diode 290 does not permit electrical circuit continuity from the alarm relay coil 278 through the junction 280, the isolating diode 290, the first pole and set of contacts 284 to ground. Therefore, the relay coil 278 becomes deenergized, the relay 282 deactuated and the relay poles returning to the disposition shown in FIG. 6, thereby extinguishing the alarm lamp 288.

It will be noted that, by utilizing the two poles and sets of contacts for the alarm relay 282, upon pressing the reset button, the alarm lamp will remain lighted unless the relay is deactuated. While only a single set of contacts can be utilized, in such a configuration depression of the reset switch would cause the alarm lamp to extinguish whether or not the alarm relay did, in fact, become deactuated. Therefore, the use of two poles and two sets of contacts provides for an additional safety factor, since the alarm lamp will remain illuminated so long as either relay circuit provides continuity to ground.

The reset isolating diode 310 is utilized to isolate the alarm circuit 212 from the warning circuit 208. The warning circuit 208, as has been mentioned heretofore, may be identical in configuration to the alarm circuit 212 shown in FIG. 6. The warning circuit 208 has a reset isolating diode 314 connected between the warning circuit 208 and the reset circuitry heretofore described for the alarm circuit. The warning circuit may be tested in the same manner as has been described with respect to the alarm circuit without the necessity of actuation of the alarm circuit. The switch 294 is shown connected in the circuitry so that, when the switch is open, depression of the test switch 304 removes the actuating potential which is normally applied to the alarm relay input lead 292. Therefore, when the potential at the junction 280 approximates ground, because no potential difference exists across the alarm relay coil 289, the alarm relay is not energized. However, the alarm lamp 288 will become illuminated and remain illuminated so long as the alarm transistor 282 continues to conduct, since the potential at the junction 280 approximates ground. Upon release of the test switch 304, the alarm transistor 272 will terminate conduction, opening circuit continuity for the alarm lamp 288, and the lamp will become extinguished.

While, in the particular circuit shown in FIG. 6, the opening and closing of the switch 294 controls whether the relays of either the alarm circuit 212 or the warning circuit 208 are actuated upon test, obviously the switch can be relocated so that only the warning circuitry relays would be actuated upon test, if such should be desirable. In applications in which it is not desired to provide for selectively of actuation of the relays in the alarm and/or warning circuitry, the switch 294 can be eliminated in its entirety, if it is never desired to actuate the relays upon test. The switch 294 is replaced by a permanent jumper, if it is desired in all instances to actuate the relays upon testing. The double pole double throw push button test switch 304 then can be replaced by a simple single pole single throw switch connected across the test output terminals 302.

Figure 7:
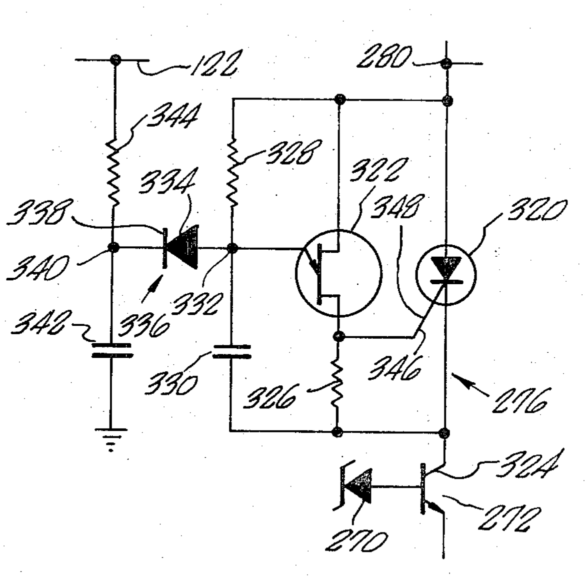
FIG. 7 is a schematic diagram of a time delay circuit for utilization with the circuitry of FIG. 6.

Referring now to FIG. 7, there is shown a schematic diagram of an electronic circuit which may be utilized to provide a time delay for relay operation. Such a time delay is advantageous during warmup of the apparatus. In addition, such a time delay circuit will avoid erroneous actuation of the warning or failure circuitry due to transients which may occur. The circuit shown in FIG. 7 is particularly adapted for use as the emitter circuit 276 heretofore referred to with respect to the alarm transistor 272. As will be seen, the emitter circuit 276 is connected between the alarm transistor 272 and the junction 280. The emitter circuit 276 has a silicon controlled rectifier 320 and a unijunction transistor 322. The silicon controlled rectifier 320 is connected directly between the junction 280 and the alarm transistor 272 at its emitter 324. The unijunction transistor 322 is connected in series with a load resistor 326 so as to be in parallel with the silicon controlled rectifier 320. Also connected in parallel with the unijunction transistor 322, and load resistor 326 and the silicon controlled rectifier 320, is an RC circuit consisting of a charging resistor 327 and biasing capacitor 330. The charging resistor 327 and biasing capacitor 330 are connected together at a junction 332 at which is also connected the input to the unijunction transistor 322 and an anode 334 of a diode 336. The diode 336 has a cathode 338 which is connected to a junction 340 between a charging capacitor 342 and a resistor 344. The resistor 344 is also connected to the lead 122, and the charging capacitor 342 to ground.

The circuit component values preferrably are selected as to their resulting time constants so that the resistance of the charging resistor 328 is in the range of at least one order of magnitude less than the resistance of the resistor 344 and the capacitance of the charging capacitor 342 is from one to two orders of magnitude greater than the capacitance of the biasing capacitor 330. In operation, then, the capacitors 342 and 330 will both be charged primarily through the charging resistor 328. However, during the period when the charging capacitor 342 is being charged, the potential at the junction 332 is such that the unijunction transistor 322 cannot conduct. Upon reaching the value of the potential applied, the charging capacitor 342 is maintained at this value through the resistor 344. Preferably the time constants of the capacitor 342 and charging resistor 328 are selected so that about 45 seconds, for example, will elapse before the charging capacitor 342 is charged to the applied potential.

As will be seen in FIG. 7, the signal developed across the load resistor 346 is applied to the silicon controlled rectifier 320 at its gate input 348. Therefore, when the potential at the emitter 324 of the alarm transistor 272 drops, by reason of conductivity of the zener diode 270, the biasing capacitor 330 commences to discharge. Because of the comparatively large time constant provided by the combination of the charging resistor 328 and biasing capacitor 330, one to two seconds will elapse before the unijunction transistor 322 commences conducting. When the unijunction transistor 322 commences conducting, a pulse is applied through the lead 342 to the gate input 348 of the silicon controlled rectifier 320, causing the rectifier to fire and thus providing circuit continuity between the junction 280 and ground, so that the potential at the junction 280 approaches ground potential. As has been described heretofore, the relays are actuated thereby, unless a test is being conducted in which it has been preselected that the relays will not operate during the test.

From the foregoing description of the preferred embodiments, it will be apparent that the present invention, while described particularly with respect to the detection of smoke or combustible gasses, may generally be applied to any type detector apparatus which generates an output signal whose magnitude is a function of the concentration of substance being detected. Further, by utilization of the failure detection circuitry heretofore described, it is now practical to locate the detectors a great distance from the remainder of the apparatus, and still have assurance of satisfactory monitoring of the operation of the detectors by reason of the failure circuitry warning characteristic. Thus, should the actuating potential fail to be applied to the detectors, the detectors fail to generate their output signals, the output signals fail to be applied to the comparator, the failure circuitry is actuated, indicating at a location remote from the detectors themselves such operational failure. Furthermore, by utilization of the test circuitry, operation of the comparator circuit can be tested for warning and alarm conditions and the test can be preselected to actuate or not actuate any alarm or control equipment associated with the analyzer.

While the circuit configuration shown generally in FIGS. 2, 3 and 4 for the printed circuit board 12 is generally satisfactory, in many applications, a modification thereof provides for greatly improved operation for certain applications, specifically, with the utilization of certain types of sensors, for example, those shown in U.S. Pat. No. 3,644,795, an automatic drift correction is desirable in order to avoid erroneous alarm indications initiated by reason of the drift of the sensor from its original zero calibration. Obviously, such a drift can be compensated for manually, by periodic calibration of the sensor and adjustment to zero. However, when the sensor is located in remote locations, not only is such a periodic calibration inconvenient, but also may be neglected by the responsible personnel in view of the location of the sensor. In addition, it has been found that in certain applications, for example in ship board monitoring of cargo holds, there is a gradual build up of gasses to a concentration which will cause the actuation of the alarm circuitry. However, in many instances such a gradual build up does not create a dangerous or explosive situation, and the monitoring which is desired is a monitoring of a rapid increase in smoke, carbon monoxide, or the like, indicating the presence of combustion. In such an instance, the automatic zeroing of the sensor to the background or ambient concentration is essential.

Figure 8:
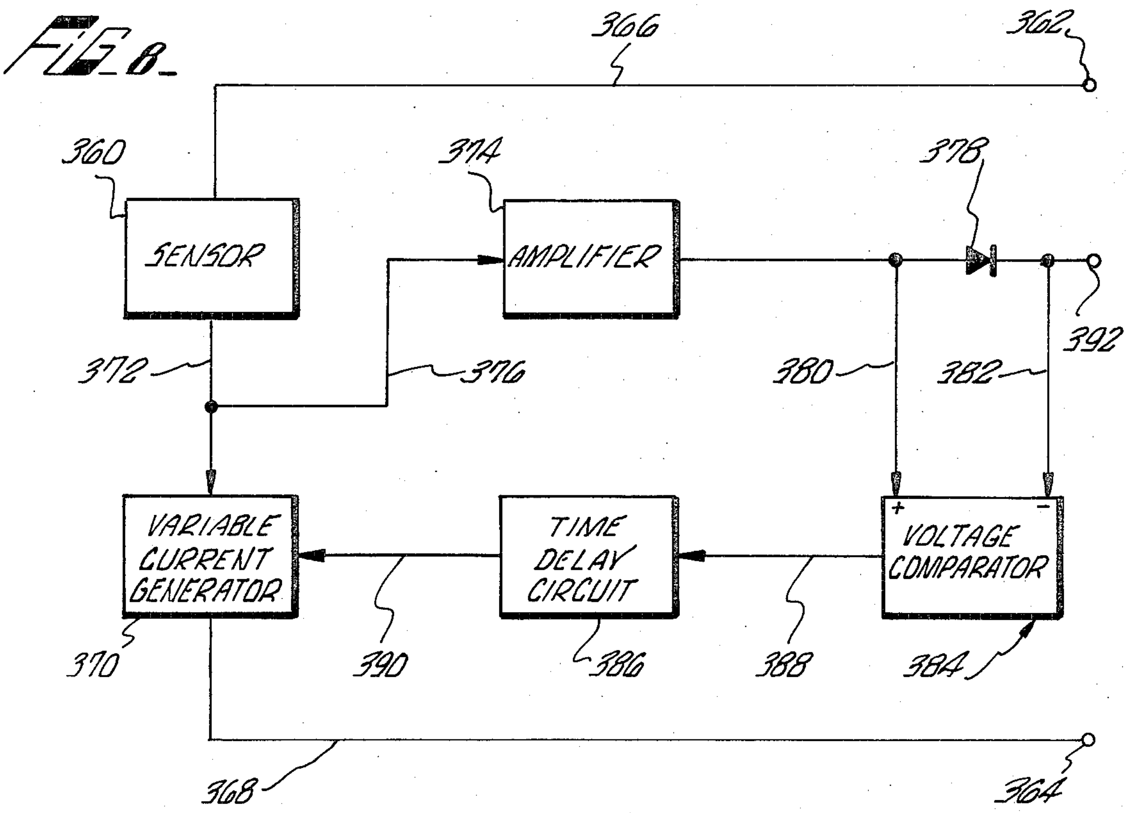
FIG. 8 is a block diagram of a circuit for the automatic drift correction or background zeroing of a detector sensor.

Referring now to FIG. 8, there is shown, in block diagram form, a circuit for the automatic drift compensation or background zeroing of a sensor. The circuit shown in FIG. 8 is not restricted in usage to any of the sensors heretofore specifically named, and is to be understood to be a circuit utilizable, in general, with any appropriate sensor in order to provide for an automatic zeroing function. The circuit provides for detector sensitivity to rapid changes in concentration while automatically compensating for long term concentration changes. In FIG. 8, a sensor 360 has an actuating potential applied thereto by means of a pair of terminals 362, 364, to which are connected an actuating potential lead 366 and a ground lead 368. A variable current generator 370 is connected between the sensor 360 and the ground lead 368 by a sensor output lead 372. A sensor output amplifier 374 is also connected to the sensor output lead 372 by a lead 376. The output of the amplifier 374 is applied to a diode 378, connected in this embodiment between a pair of input leads 380, 382 so as to apply the inputs to a voltage comparator 384. The output of the voltage comparator 384 is applied to a time delay circuit 386 through a lead 388. The time delay circuit output is applied to the variable current generator 370 by an output lead 390. In operation, the variable current generator 370 functions to maintain a constant output signal in the lead 376 by controlling the current flow in the sensor output circuit.

In the circuit of FIG. 8, the diode 378 corresponds to the diode 58 of the printed circuit board 12 of FIGS. 2, 3 and 4. An output terminal 392 corresponds to the detector connector pin 64 which carries the output signal of the sensor assembly to the remainder of the detector circuitry. The potential existing at the pin 392, in the absence of detection has been preselected as appropriate for the remainder of the circuitry, with respect to the function to be provided. There is no change in the output potential at the pin 392 until such time as the output of the amplifier 374 is sufficient to cause conduction through the diode 378. The voltage comparator 384 is of the differential amplifier type, for example. Thus, the output signal applied to the time delay circuit 386 from the voltage comparator 384 through the lead 388 is a function of the difference in potential between the leads 380, 382. So long as the diode 378 is conducting, the existence in the lead 380 of a potential more positive than exists in the lead 382 will cause the voltage comparator to apply a more positive output signal to the time delay circuit, whose function is to control the circuit output of the variable current generator. In operation, the increase in output potential in the voltage comparator output lead 388 produces an increase in the current flowing in the sensor output circuit by reason of the variable current generator 370. The time delay circuit 386 functions to inhibit the change in current flow which would otherwise occur by reason of a change in sensor resistance. In other words, when the potential in the lead 372 would otherwise tend to rise, by reason of the detection by the sensor of an increase in concentration, the variable current generator, under the control of the time delay circuit, inhibits the increase in current flow which would otherwise occur in the sensor output circuit by reason of the decrease in overall circuit resistance.

Figure 9:
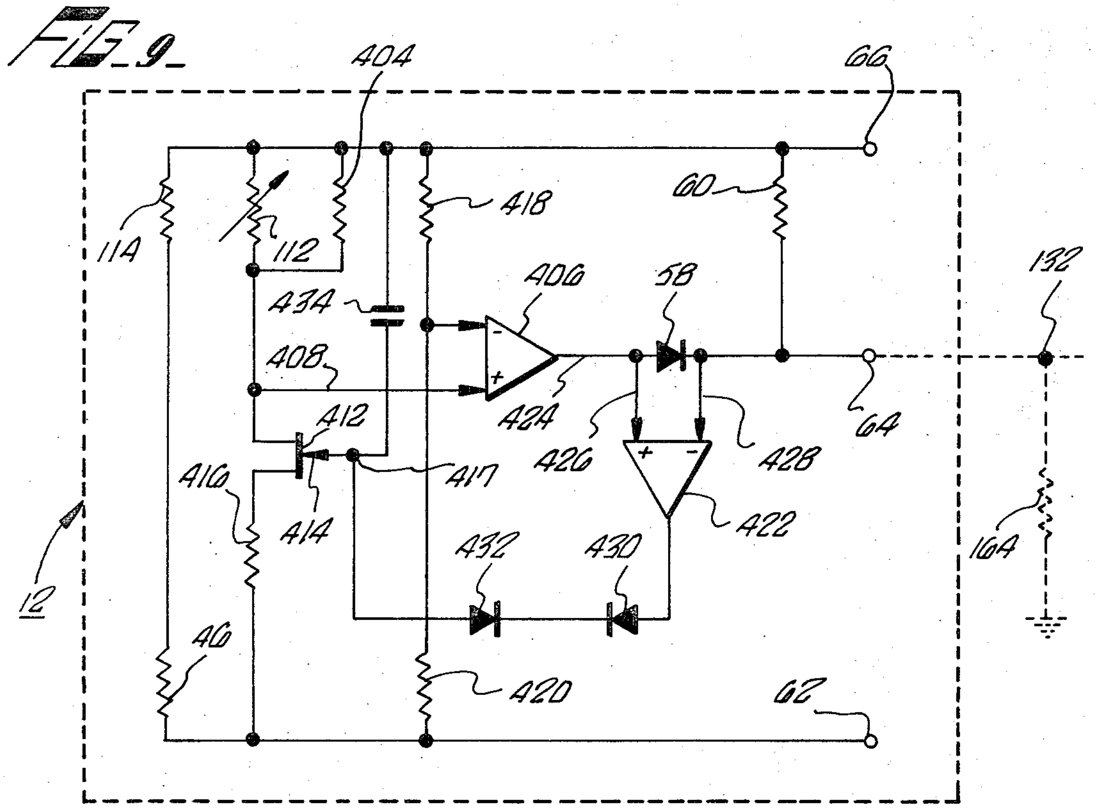
FIG. 9 is a schematic diagram of a preferred embodiment of the circuit of FIG. 8.

The foregoing description of operation of the automatic zero or drift compensation circuit will be more readily understood by referring to FIG. 9, a schematic diagram of a specific embodiment of circuit components which make up the block diagram of FIG. 8. In FIG. 9, the circuitry is set out in a specific embodiment which is an adaptation of the circuitry utilized in the printed circuit board 12 for convenience of explanation. As shown in FIG. 9, a printed circuit board 12' includes the sensor 112, heater element 114, and current limiting resistor 46. A linearizing resistor 404 connected in parallel with the sensor 112 provides to linearize the non-linear sensor output signal. The sensor output signal is applied to a differential amplifier 406 through an input lead 408 which is connected to the sensor 112. A resistor 416 also constitutes a portion of the circuitry for a field effect transistor 412. The transistor 412 has a gate 414 which is electrically connected to a junction 417. A voltage divider network is formed by resistors 418, 420 and applies a reference potential to the differential amplifier 406. The output of the differential amplifier 406 is applied to a second differential amplifier 422 through a first differential amplifier output lead 424 and a second differential amplifier input lead 426. The first differential amplifier output lead 424 also applies the first differential amplifier output to the diode 58. The reference potential developed by the detector circuitry across the resistors 60, 164 is applied to the cathode of the diode 58 and to the second differential amplifier 422 through a second input lead 428. The output of the second differential amplifier 422 is applied to a pair of serially connected diodes 430, 432. The diode 430 may be of any appropriate conventional type. However, the diode 432 is of the low leakage reverse current type, such as Fairchild number FD300. As will be seen in FIG. 9, the diodes 430, 432 are connected in opposing polarity, and the diode 432 will be nonconducting except for reverse leakage current flow, when the diode 430 conducts. A low leakage type charging capacitor 434, whose function will be explained hereinafter, is severally connected between the junction 417 to which the low leakage diode 432 is also connected and the positive potential applied to the board 12' at the pin 66, so as to form a serially connected charging circuit with the diode 432.

The operation of the circuit of FIG. 9 will now be explained. Upon the detection of an increased concentration of gas by the sensor 112, the sensor will decrease in resistance, causing an increase in the potential in the lead 408. This increase in potential will cause the potential in the output lead 424 of the first differential amplifier 406 to increase and diode 58 to conduct. The subsequent circuitry operation upon conduction of diode 58 has already been described. The diode 58 is normally zero biased. Upon the occurrence of a slight increase in gas concentration, i.e., one less than that which is desired to be detected, the diode 58 will remain nonconducting, although the potential in the input lead 426 will exceed the potential in the input lead 428. The second differential amplifier 422 output increases in potential in response to this input potential differential, causing an increased positive potential to be applied to the anode of the first diode 430. The diode 430 then commences to conduct. However, this increased positive potential is applied to the anode of the second diode 432 as an increase in reverse bias. Although, in the general sense nonconducting, there is a small amount of leakage current which flows through the second diode 432 even though the diode is reversed biased, causing an increase in the potential of the anode of the second diode 432.

The charging capacitor 434 has a comparatively large capacity, for example, ten microfarads. Upon the change in gas concentration heretofore assumed as having been detected, the potential in the lead 408 having increased, and the gradual increase in potential of the anode of the diode 432 causes an increase in the conduction through the transistor 412 and resistor 416 by reason of the increase in the bias of the transistor. This increase in current conduction compensates for a decrease in the resistance of the sensor and the resulting increase in the potential existing in the lead 408. The potential in the lead 408 is therefore decreased, this potential being determined by the voltage divider network formed by the sensor 112 and linearizing resistor 404, and resistor 416 and transistor 412. Because of the low magnitude of current flow through the reversed biased diode 432, a comparatively long time is required in order for the anode of the diode 432 to reach the same potential as its cathode. Consequently, the rate of change of conduction of the transistor 412 is very slow, as the bias applied to the gate 414 through the junction 417 is controlled by the potential of the anode of the reverse biased diode 432.

In other words, a preselected time interval, preferably long, is required to return the potential existing in the lead 408 to its original value. However, the potential will be returned to its original value when the gas concentration being detected remains constant for the period of the time interval. For gradual small changes in gas concentration, or the equivalent in zero drift in the sensor, the rate of conduction of the transistor 412 will be continuously changing as the compensating circuit seeks to compensate for the actual or apparent changes in sensor resistance so as to return the potential in the lead 408 to its original value. The duration of this time interval is preselected by the selection of the capacitance value of the capacitor 434 and the resistance provided by the reverse bias conduction of the diode 432.

In operation, upon a decrease in gas concentration, the resistance of the sensor 112 increases, causing a decrease in the potential in the lead 408 and consequently a decrease in the potential applied to the second differential amplifier 422 by the input lead 426. The output of the differential amplifier 422 therefore decreases in potential, causing the diode 430 to become reverse biased, and the diode 432 to be forward biased. The diode 432 therefor conducts, and the diode 430, not being a low leakage diode, although reverse biased, conducts a relatively large amount of current, as compared to the reverse bias conduction of the diode 432. This reverse bias conduction of the diode 430 permits the charging capacitor 434 to discharge. The discharge of the charging capacitor 434 through the forward biased diode 432 and reverse biased diode 430 decreases the bias on the transistor 412, causing a decrease in current flow provided by the variable generator circuit. The decrease in current flow through transistor 412 is accompanied by a corresponding increase in the potential in the lead 408, so as to tend to return the potential in the lead 408 to its original value.

As a practical consideration for certain commercial applications, it is necessary to avoid actuation of the detector or alarm circuitry or other output circuitry upon a sudden decrease in gas concentration. Such a decrease, will occur, for example, when a shipboard cargo hold is opened. Such a cargo hold may have up to 500 parts per million of gasses if the ship has been at sea for some length of time. Upon opening of the hold, a rapid circulation of fresh air into the hold occurs, causing a considerable variation in gas concentration in various portions of the hold. While over an extended period of time, the gas concentration within the hold will gradually decrease to zero, at any given moment during the decrease in concentration, some portions of the atmosphere within the hold may still contain quite high concentrations of gasses. If, because of the atmospheric flow within the hold during this reduction in concentration, one of these high concentration portions should contact the detector sensor just after being exposed to fresh air, the alarm and other output circuitry would be actuated. Therefore, it is necessary to provide a gradual return of the sensor to its true zero calibration, rather than an immediate return upon initial contact of uncontaminated air with the sensors. Such a gradual return is provided for by the diode 430. If such a gradual return is not required or desired, a resistor can be substituted for the diode 430.

In summary, in operation, the transistor 412 functions as a variable current generator by changing current flow through it and resistor 416, as required, in order to tend toward the stabilization of the input potential in lead 408 as applied to the first differential amplifier 406. The input applied by the voltage divider network 418, 420 remains constant. A change in the potential applied by the sensors 112 can result from either sensor drift or gas detection. For the particular application being described, only changes resulting from relatively large rapid changes in gas concentration are to actuate the detector output circuitry. The time constant provided by the charging capacitor 434 and the equivalent resistance of reverse bias conduction by the diode 432 are preselected to provide for continuous zeroing over a comparatively long time period, so that only a rapid increase in gas concentration actuates the output circuitry by causing diode 58 to conduct. The transistor 412 functions as a variable current generator, so that the current flow through the voltage divider network consisting of resistor 416, transistor 412, and the resistance formed by the parallel connected sensor 112 and resistor 404 changes in order to tend to stabilize the potential in the lead 408. By reason of the charging circuit time constants, this potential in the lead 408 is stabilized, except when a very rapid and large change in gas concentration occurs. When such a change occurs, the current generator, because of the time delay circuit, is unable to maintain potential in the lead 408 sufficiently close to its value immediately prior to the detection of the gas, and the diode 58 then conducts, causing the generator of an output signal at the connector pin 64, so as to actuate the output circuitry.

In the specific example of FIG. 9, it will be noted that the charging capacitor 434 is connected between the junction 417 and the source of positive potential applied to the pin 66. Alternatively, the charging capacitor could be connected between the junction 417 and the common connection provided by pin 62. However, in such an alternative arrangement, the board 12′ generates an output signal continuously during warmup, so that alarm circuitry contained in the detector will be actuated erroneously until such time as the device reaches its stable operating condition. While, in certain circumstances, it may be preferable to have such a continuous alarm indication in order to indicate that the device has not yet reached its normal operating condition, generally preferred embodiment, by connection the charging capacitor 434 to the source of positive potential, a zero concentration output signal is generated until such time as the normal operation condition is reached and, thereafter, an actual concentration of gas, in excess of that concentration which is the maximum for which the time delay circuit can automatically compensate without conduction by the diode 58, is detected.

The foregoing apparatus provides a system that will operate for long periods of time without maintenance, but which will readily detect smoke from an incipient fire or a sudden precipitous rise in combustible gas concentration. By utilizing the automatic zeroing feature, the system is designed to cancel out slow increases in ambient conditions, including a slow buildup of combustible gasses to be detected that may be generated from sources other than incipient fires. The particular design parameters given by way of example are specifically directed towards utilization in shipboard operation. In such operation, by way of one example, a buildup of 100 parts per million of combustible gas over more than a five hour period is not to be detected. This particular parameter has been found, by experience on board ship, to be a satisfactory design parameter for an extended cruise, for example, 10 days. During such an extended cruise, ambient gas buildup has been found to occur in closed cargo holds, but is not desired to be detected. It is believed that this ambient gas buildup is a result from rusting and out-gassing of the cargo and the walls of the ship's hold. The specific example given provides for the automatic zeroing with respect to ambient gas buildup less than this maximum rate, while still providing for detector indication and alarm actuation upon a gas increase in excess of this rate.

As has been mentioned heretofore, the circuitry described with respect to FIGS. 8 and 9 may be utilized either for automatic zeroing or for automatic calibration for drift. The specific example given has referred previously to automatic zeroing with respect to ambient gas conditions. If, under such conditions, it is desired to obtain a reading as to the actual ambient gas content, the sensor may be flushed with a reference gas. This flushing will result in a rapid return to true zero measurement conditions, in the manner similar to that described with respect to the effect of opening the hatch cover of a cargo hold. Thereafter, a reading may be obtained of the actual ambient gas concentration, due to the long time interval required for the device to return to its ambient zero reading. Of course, in such a utilization, alarm circuitry and the like should be disabled prior to obtaining an actual gas concentration reading sufficient to actuate alarm circuitry.

With respect to application of the present invention to simple drift calibration, such is automatically provided for in the just described application. However, for portable instruments, or other instruments which generally are not subjected to an ambient atmosphere which contains a significant combustible gas or smoke content, and which are utilized from time to time to monitor such environments as do contain significant gas or smoke, drift in the sensor is automatically corrected for by the circuitry of FIGS. 8 and 9, as the normal environment acts as a continuous zero concentration sample. The maximum drift which is to be anticipated from a particular type of sensor is readily obtained from experimental data. The time constant of the time delay circuit is then preselected in order to provide for a time constant which will permit automatic correction from the maximum drift to be experienced. In any practical device, the maximum drift to be experienced is much less, over a short time interval, than any significant gas concentration to be monitored. Therefore, the circuitry of FIGS. 8 and 9 provides for continuous zero calibration of the detector, so that any significant gas concentration is detected immediately, but without the necessity of periodically specifically checking the detector for its zero calibration.

The invention claimed is:

1. In a gaseous detection apparatus, the combination of:

comparator means having a first signal input and a second signal input and operable to generate an output whose magnitude is a function of a difference in magnitude between signals applied to the first and second signal inputs;

first input signal generating means operable to detect the presence of a preselected substance and to generate a first signal for application to the first signal input of a magnitude which varies unidirectionally from a nominal value as a function of the concentration of the substance being detected and including means for inhibiting the variation in magnitude of the first signal from its nominal value unless the rate of change of concentration detected exceeds a pre-selected rate and variable resistance means whose resistance varies as a function of gas concentration detected and in which the inhibiting means includes variable current generator means having an input to which an electrical potential is applied, the magnitude of which controls the current generated by the generator means, voltage divider means including means connecting said variable resistance means and said variable current generator means in series across a source of electrical potential to produce an output signal whose magnitude is a function of the voltage drop across the variable resistance means relative to the voltage drop across the generator means, means for generating a control signal which is a function of deviation in magnitude of the output signal from a preselected value, and means for applying the control signal to the generator means input for changing current flow in the generator means so as to return the output signal to the preselected value and including a time delay circuit to which the control signal is applied as an input and whose output is applied as the generator means input, said time delay circuit having a charge time constant which is preselected in magnitude so as to predetermine the rate of of change of current flow in the generator means;

second input signal generating means operable to generate a second signal of said nominal magnitude for application to the second signal input;

output signal generating means operable to generate an output signal in response to variations in the magnitude of the output from the comparator means;

means for applying the comparator output to the output means; and means for applying the first and second signals to the first and second signal inputs, including circuit failure detection means connected to the first input signal generating means and the second input signal generating means and operable to indicate circuit failure upon the failure of either of said input signal generating means to apply its signal to said comparator means.

2. The combination of claim 1, and in which the means for generating a control signal comprises:

a source of reference voltage of said preselected value, voltage comparator circuit means whose output constitutes the control signal and having a pair of inputs, means for applying said reference voltage to one of said comparator inputs, and means for applying the voltage divider output signal to the other of said comparator inputs.

3. The combination of claim 2, and in which the time delay circuit comprises:

a diode and a capacitor serially connected together at a junction, means for applying the control signal to the diode as a reverse bias, and means electrically connecting the junction to the generator means input to provide the electrical potential whose magnitude controls the current flow in the generator means.

4. The combination of claim 3, and in which the time delay circuit comprises:

a diode and a capacitor serially connected together at a junction, means for applying the control signal to the diode as a reverse bias, and means electrically connecting the junction to the generator means input to provide the electrical potential whose magnitude controls the current flow in the generator means.

5. The combination of claim 4 and in which the first input signal generating means includes a plurality of detectors remote one from another and connected in parallel and in which said first input signal generating means is operable to generate said first signal such that its magnitude is a function of the greatest concentration of said substance being detected by any of said detectors.

6. The combination of claim 4 and in which the first signal input generating means includes means for inhibiting the variation in magnitude of the first signal from its nominal value unless the rate of change of concentration detected exceeds a preselected rate.

7. The combination of claim 4 and in which the second input signal generating means includes a plurality of detectors remote one from another and connected in parallel and in which said second input signal generating means is operable to generate said second signal such that its magnitude is a function of the greatest concentration of said substance being detected by any of said detectors.

8. Apparatus for detecting the presence of smoke or combustible gas comprising:

at least one first detector of the type whose output signal varies unidirectionally in magnitude in a given direction from a nominal value as a function of smoke or combustible gas concentration;

at least one second detector of the type whose output signal varies unidirectionally in magnitude in the opposite direction in said nominal value as a function of smoke or combustible gas concentration;

a comparator of the differential amplifier type having a first input to which the first detector output signal is applied, a second input to which the second detector output signal is applied, and an output which varies in magnitude unidirectionally in a first direction from a nominal value as a function of a differential in magnitude between signals applied to the first and second inputs;

a source of an actuating potential;

interconnection and failure detection means operable to apply the actuating potential to the first and second detectors to actuate the same, to apply the first and second detector output signals to the respective comparator inputs, and operable upon a failure in application of the actuating potential to either of the detectors or a failure of either of the detectors to generate said output signals or a failure to either of said output signals to be applied to the comparator to indicate failure of the apparatus and including an actuation failure circuit controlled by current flow through the detectors in response to their actuation by the application thereto of the actuating potential, whereby an operational failure of any detector is detected by a decrease in said current flow, said actuation failure circuit being operable in response to said decreased current flow to indicate a failure in the apparatus operation; and output signal generating means connected to the comparator and actuated by said comparator output.

9. Apparatus according to claim 8 and in which the interconnection and failure detection means includes a signal application failure circuit operable in response to a change in the magnitude of the comparator output from its nominal value in a direction opposite the first direction to indicate a failure in apparatus operation;

means connected to the comparator to cause the comparator output to change in magnitude from its nominal value in a direction opposite said first direction in response to failure to apply a signal from any detector to the comparator; and means for applying the comparator output to said signal application failure circuit.

10. Apparatus according to claim 8, and in which the second detector includes:

variable resistance means whose resistance varies as a function of gas concentration;

variable current generator means having an input to which an electrical potential is applied, the magnitude of which controls the current flow in the generator means, voltage divider means including means connecting said variable resistance and said variable current generator means in series across a source of electrical potential to produce an output signal whose magnitude is a function of the voltage drop across the variable resistance relative to the voltage drop across the generator means, means for generating a control signal which is a function of deviation in magnitude of the output signal from a preselected value, and means for applying the control signal to the generator means input for changing current flow in the generator means so as to return the output signal to the preselected value and including a time delay circuit to which the control signal is applied as an input and whose output is applied as the generator means input, said time delay circuit having a charge time constant which is preselected in magnitude so as to predetermine the rate of change of current flow in the generator means.

11. Apparatus for detecting the presence of smoke or combustible gas comprising:

at least one first detector of the type whose output signal varies unidirectionally in magnitude in a given direction from a nominal value as a function of smoke or combustible gas concentration;

at lease one second detector of the type whose output signal varies unidirectionally in magnitude in the opposite direction in said nominal value as a function of smoke or combustible gas concentration;

a comparator of the differential amplifier type having a first input to which the first detector output signal is applied, a second input to which the second detector output signal is applied, and an output which varies in magnitude unidirectionally in a first direction from a nominal value as a function of a differential in magnitude between signals applied to the first and second inputs;

a source of an actuating potential;

interconnection and failure detection means operable to apply the actuating potential to the first and second detectors to actuate the same, to apply the first and second detector output signals to the respective comparator inputs, and operable upon a failure in application of the actuating potential to either of the detectors or a failure of either of the detectors to generate said output signals or a failure to either of ssid output signals to be applied to the comparator to indicate failure of the apparatus and including a signal application failure circuit operable in response to a change in the magnitude of the comparator output from its nominal value in a direction opposite the first direction to indicate a failure in apparatus operation;

means connected to the comparator to cause the comparator output to change in magnitude from its nominal value in a direction opposite said first direction in response to failure to apply a signal from any detector to the comparator;

means for applying the comparator output to said signal application failure circuit; and output signal generating means connected to the comparator and actuated by said comparator output.

12. Apparatus for detecting the presence of smoke or combustible gas comprising:

at least one first detector of the type whose output signal varies unidirectionally in magnitude in a given direction from a nominal value as a function of smoke or combustible gas concentration;

at least one second detector of the type whose output signal varies unidirectionally in magnitude in the opposite direction in said nominal value as a function of smoke or combustible gas concentration;

a comparator of the differential amplifier type having a first input to which the first detector output signal is applied, a second input to which the second detector output signal is applied, and an output which varies in magnitude unidirectionally in a first direction from a nominal value as a function of a differential in magnitude between signals applied to the first and second inputs;

a source of an actuating potential;

interconnection and failure detection means operable to apply the actuating potential to the first and second detectors to actuate the same, to apply the first and second detector output signals to the respective comparator inputs, and operable upon a failure in application of the actuating potential to either of the detectors or a failure of either of the detectors to generate said output signals or a failure to either of said output signals to be applied to the comparator to indicate failure of the apparatus and including variable resistance means whose resistance varies as a function of gas concentration;

variable current generator means having an input to which an electrical potential is applied, the magnitude of which controls the current flow in the generator means;

voltage divider means including means connecting said variable resistance and said variable current generator means in series across a source of electrical potential to produce an output signal whose magnitude is a function of the voltage drop across the variable resistance relative to the voltage drop across the generator means;

means for generating a control signal which is a function of deviation in magnitude of the output signal from a preselected value;

means for applying the control signal to the generator means input for changing current flow in the generator means so as to return the output signal to the preselected value and including a time delay circuit to which the control signal is applied as an input and whose output is applied as the generator means input, said time delay circuit having a charge time constant which is preselected in magnitude so as to predetermine the rate of change of current flow in the generator means; and output signal generating means connected to the comparator and actuated by said comparator output.

13. In a detection apparatus of the Wheatstone bridge type, the combination of a comparator of the differential amplifier type having a first input to which a first signal is applied, a second input to which a second signal is applied, at least one of said signals being an output signal derived from the Wheatstone bridge, and an output which varies in magnitude unidirectionally in a first direction from a nominal value as a function of a differential in magnitude between signals applied to the first and second inputs;

a source of an actuating potential;

malfunction detection means operable to connect the actuating potential to the Wheatstone bridge to actuate the same and to apply the first and second signals to the respective comparator inputs, and operable, in response to a failure in application of the actuating potential to the Wheatstone bridge or a failure to generate said first and second signals or a failure of either of said signals to be applied to the comparator or a failure of the comparator normally to generate said nominal value output signal, to detect the malfunction of the apparatus;

test input signal generating means, independent of said Wheatstone bridge, for selectively generating a test input signal for application to the comparator, the application of which to the comparator produces a comparator output which corresponds to a malfunction of the apparatus;

output means for indicating malfunction of the apparatus, said output means being connected to the comparator and being actuated by the comparator output, said output means including a first output circuit of the visible indicator type and a second output circuit; and output circuit actuation means operable, upon the detection by the malfunction detection means of an actual malfunction to actuate both said output means first and second output circuits, and operable in response to the application of the test input signal to the comparator to actuate only the output means first output circuit.

14. The combination of claim 13 and in which the output means second output circuit is of the latching relay type including means for resetting said latching relay type output circuit subsequent to the termination of the application to the comparator of the signal producing the malfunction detection.

15. In a detection apparatus of the Wheatstone bridge type, the combination of a comparator of the differential amplifier type having a first input to which a first signal is applied, a second input to which a second signal is applied, at least one of said signals being an output signal derived from the Wheatstone bridge, and an output which varies in magnitude unidirectionally in a first direction from a nominal value as a function of a differential in magnitude between signals applied to the first and second inputs;

a source of an actuating potential;

malfunction detection means operable to connect the actuating potential to the Wheatstone bridge to actuate the same and to apply the first and second signals to the respective comparator inputs, and operable, in response to a failure in application of the actuating potential to the Wheatstone bridge or a failure to generate said first and second signals or a failure of either of said signals to be applied to the comparator or a failure of the comparator normally to generate said nominal value output signal, to detect a malfunction of the apparatus;

test input signal generating means, independent of said Wheatstone bridge, for selectively generating a test input signal for application to the comparator, the application of which to the comparator produces a comparator output which corresponds to a malfunction of the apparatus;

output means for indicating malfunction of the apparatus, said output means being connected to the comparator and being actuated by the comparator output, said output means including a first output circuit of the visible indicator type and a second output circuit; and output circuit actuation means operable, upon the detection by the malfunction detection means of an actual malfunction to actuate both said output means first and second output circuits, said output circuit actuation means being preselectively operable in response to the application of the test input signal to the comparator to actuate either both said output means first and second output circuits or only one of said output means output circuits.

16. The combination of claim 15 and in which the output means second output circuit is of the latching relay type including means for resetting said latching relay type output circuit subsequent to the termination of the application to the comparator of the signal producing the malfunction detection.

17. Apparatus for automatically compensating for changes in resistance of a variable resistance comprising:

variable current generator means having an input to which an electrical potential is applied, the magnitude of which controls the current flow in the generator means, voltage divider means including means connecting said variable resistance and said variable current generator means in series across a source of electrical potential to produce an output signal whose magnitude is a function of the voltage drop across the variable resistance relative to the voltage drop across the generator means, means for generating a control signal which is a function of deviation in magnitude of the output signal from a preselected value, and means for applying the control signal to the generator means input for changing current flow in the generator means so as to return the output signal to the preselected value and including a time delay circuit to which the control signal is applied as an input and whose output is applied as the generator means input, said time delay circuit having a charge time constant which is preselected in magnitude so as to predetermine the rate of change of current flow in the generator means.

18. The combination of claim 17, and in which the means for generating a control signal comprises:

a source of reference voltage of said preselected value, voltage comparator circuit means whose output constitutes the control signal and having a pair of inputs, means for applying said reference voltage to one of said comparator inputs, and means for applying the voltage divider output signal to the other of said comparator inputs.

19. The combination of claim 18 and in which the time delay circuit comprises:

a diode and a capacitor serially connected together at a junction, means for applying the control signal to the diode as a reverse bias, and means electrically connecting the junction to the generator means input to provide the electrical potential whose magnitude controls the current flow in the generator means.

20. The combination of claim 17 and in which the time delay circuit comprises:

a diode and a capacitor serially connected together at a junction, means for applying the control signal to the diode as a reverse bias, and means electrically connecting the junction to the generator means input to provide the electrical potential whose magnitude controls the current flow in the generator means.

* * * * *

UNITED STATES PATENT OFFICE
CERTIFICATE OF CORRECTION

Patent No. 3,801,972 Dated April 2, 1974

Inventor(s) YOUNG HO KIM and NEIL M. KING

It is certified that error appears in the above-identified patent and that said Letters Patent are hereby corrected as shown below:

| | |
|---|---|
| Col. 2, line 27 | "takn" should read --taken-- |
| Col. 4, line 43 | "be" should read --by-- |
| Col. 8, line 15 | "rotations" should read --notations-- |
| Col. 11, line 19 | after "meter 170" insert --as a result of current flow through the meter. If both the gas-- |
| Col. 11, line 26 | after "plus" insert --input, and the comparator amplifier output will decrease in-- |
| Col. 12, line 46 | "thre" should read --three-- |
| Col. 23, line 23 | "generator" should read --generation-- |
| Col. 28, line 9 | "ssid" should read --said-- |

Signed and sealed this 31st day of December 1974.

(SEAL)
Attest:

McCOY M. GIBSON JR.
Attesting Officer

C. MARSHALL DANN
Commissioner of Patents